US007558555B2

(12) United States Patent
Nagy

(10) Patent No.: US 7,558,555 B2
(45) **Date of Patent: *Jul. 7, 2009**

(54) SELF-STRUCTURING SUBSYSTEMS FOR GLASS ANTENNA

(75) Inventor: Louis L. Nagy, Warren, MI (US)

(73) Assignee: Delphi Technologies, Inc., Troy, MI (US)

( * ) Notice: Subject to any disclaimer, the term of this patent is extended or adjusted under 35 U.S.C. 154(b) by 561 days.

This patent is subject to a terminal disclaimer.

(21) Appl. No.: 11/282,024

(22) Filed: Nov. 17, 2005

(65) Prior Publication Data

US 2007/0111690 A1 May 17, 2007

(51) Int. Cl.
*H04B 1/00* (2006.01)

(52) U.S. Cl. .................................................... 455/277.1

(58) Field of Classification Search .............. 455/550.1, 455/575.1, 272, 274, 277.1, 278.1, 345; 343/700 MS, 343/702, 906, 908, 909
See application file for complete search history.

(56) References Cited

U.S. PATENT DOCUMENTS 5,056,153 A * 10/1991 Taniguchi et al. ........ 455/277.1
5,502,453 A 3/1996 Tsukamoto et al.
5,579,024 A 11/1996 Sureau
5,621,423 A 4/1997 Sureau
5,752,200 A 5/1998 Meredith et al.
6,075,485 A 6/2000 Lilly et al.
6,175,723 B1 1/2001 Rothwell, III
6,208,316 B1 3/2001 Cahill
6,212,242 B1 4/2001 Smith et al.
6,363,263 B1 3/2002 Reudink et al.
6,396,449 B1 5/2002 Osterhues et al.
6,396,451 B1 5/2002 Wu et al.
6,417,807 B1 7/2002 Hsu et al.
6,512,494 B1 1/2003 Diaz et al.
6,525,695 B2 2/2003 McKinzie, III (Continued)

FOREIGN PATENT DOCUMENTS

EP 0539297 4/1993

(Continued)

OTHER PUBLICATIONS

J.E.Ross et al, "Numerical Simulation of a Self-Structuring Antennas Based on a Genetic Algorithm optimization Scheme," 2000 AP-S/URSI Symposium, Salt Lake City, UT, Jul. 2000.

(Continued)

*Primary Examiner*—Thanh C Le
(74) *Attorney, Agent, or Firm*—Jimmy L. Funke

(57) ABSTRACT

An antenna system includes a plurality of antenna elements, switching elements, and transmission feed lines disposed on a rear window glass. The switching elements are arranged with the antenna elements and transmission feed lines to, when selectively closed, electrically couple selected antenna elements and transmission feed lines to one another to generate an antenna configuration selected from a plurality of antenna configurations. A non-volatile memory is configured to store data representing at least some of the plurality of antenna configurations. A control arrangement is operatively coupled to the switching elements and is configured to close selected switching elements as a function of the data stored in said memory. The system is selectively updated as a function of previously selected antenna configurations.

16 Claims, 6 Drawing Sheets

U.S. PATENT DOCUMENTS

| | | | |
|---|---|---|---|
| 6,714,771 | B1 | 3/2004 | Nagy et al. |
| 6,842,609 | B2 | 1/2005 | Davis et al. |
| 6,950,629 | B2 | 9/2005 | Nagy |
| 2002/0036718 | A1 | 3/2002 | Lee |
| 2002/0167457 | A1 | 11/2002 | McKinzie, III et al. |
| 2003/0100333 | A1 | 5/2003 | Standke et al. |
| 2003/0103011 | A1 | 6/2003 | Rogers et al. |
| 2003/0219035 | A1 | 11/2003 | Schmidt |
| 2003/0228857 | A1 | 12/2003 | Maeki |
| 2005/0012677 | A1 | 1/2005 | Brown et al. |

FOREIGN PATENT DOCUMENTS

| | | |
|---|---|---|
| EP | 1120856 | 8/2001 |
| GB | 2335798 | 9/1999 |

OTHER PUBLICATIONS

C.M. Coleman et al., "Application of Two-Level Evolutionary Algorithms to Self-Structuring Antennas," 2001 URSI National Radio Science Meeting, Boston, MA, Jul. 2001.

C.M. Coleman et al., Self-structuring antennas, IEEE Antennas and Propagation Magazine, vol. 44(3), p. 11-23, Jun. 2002.

C.M. Coleman et al., Investigation of Simulated annealing, ant-colony optimization, and genetic algorithms for self-structuring antennas, IEEE Transactions on Antennas and Propagation, vol. 52(4), p. 1007-1014, Apr. 2004.

R.C. Johnson, "Antenna Engineering Handbook", Third Edition, Fundamentals of Antennas, Henry Jasic, Chpt. 2, pp. 1-3; Slot Antennas; Croswell, et al.; Chpt. 8, pp. 1-18; Slot-Antenna Arrays, Yee, et al., pp. 1-37; Frequency-Independent Antennas, DuHamel, et al., Chpt. 14, pp. 1-10, Issued 1993.

J.D. Kraus, "Antennas", Second Edition, pp. 624-627 and 632-635, Issued 1988.

General Motors R&D Center "Search", vol. 31, No. 1, Jul. 1997, pp. 1-6.

* cited by examiner

SELF-STRUCTURING SUBSYSTEMS FOR GLASS ANTENNA

FIELD

This disclosure relates generally to communication services. More particularly, this disclosure relates to self-structuring antenna subsystems.

BACKGROUND

The vast majority of vehicles currently in use incorporate vehicle communication systems for receiving or transmitting signals. For example, vehicle audio systems provide information and entertainment to many motorists daily. These audio systems typically include an AM/FM radio receiver that receives radio frequency (RF) signals. These RF signals are then processed and rendered as audio output. A vehicle communication system may incorporate other functions, including, but not limited to, wireless data and voice communications, global positioning system (GPS) functionality, and satellite-based digital audio radio services (SDARS). The vehicle communication system may also incorporate remote function access (RFA) capabilities, such as remote keyless entry, remote vehicle starting, seat adjustment, and mirror adjustment.

Communication systems, including vehicle communication systems, typically employ antenna systems including one or more antennas to receive or transmit electromagnetic radiated signals. In general, such antenna systems have predetermined patterns and frequency characteristics. These predetermined characteristics are selected in view of various factors, including, for example, the ideal antenna RF design, physical antenna structure limitations, and mobile environment requirements. Because these factors often compete with each other, the resulting antenna design typically reflects a compromise. For example, an antenna system for use in an automobile or other vehicle preferably operates effectively over several frequency bands (e.g., AM, FM, television, RFA, wireless data and voice communications, GPS, and SDARS), having distinctive narrowband and broadband frequency characteristics and distinctive antenna pattern characteristics within each band. Such antenna systems also preferably are capable of operating effectively in view of the structure of the vehicle body (i.e., a large conducting structure with several aperture openings). The operating characteristics (i.e., transmitting and receiving characteristics) of such antenna systems preferably are independent of the vehicle body style, orientation, and weather conditions. To accommodate these design considerations, a conventional vehicle antenna system can use several independent antenna systems and still only marginally satisfy basic design specifications.

Significant improvement in mobile antenna performance can be achieved using an antenna that can alter its RF characteristics in response to changing electrical and physical conditions. One type of antenna system that has been proposed to achieve this objective is known as a self-structuring antenna (SSA) system. An example of a conventional SSA system is disclosed in U.S. Pat. No. 6,175,723, entitled "SELF-STRUCTURING ANTENNA SYSTEM WITH A SWITCHABLE ANTENNA ARRAY AND AN OPTIMIZING CONTROLLER," to Rothwell III ("the '723 patent"). The SSA system disclosed in the '723 patent employs antenna elements that can be electrically connected to one another via a series of switches to adjust the RF characteristics of the SSA system as a function of the communication application or applications and the operating environment. A feedback signal provides an indication of antenna performance and is provided to a control system, such as a microcontroller or microcomputer, that selectively opens and closes the switches. The control system is programmed to selectively open and close the switches in such a way as to improve antenna optimization and performance.

Conventional SSA systems may employ several switches in a multitude of possible configurations or states. For example, an SSA system that has 24 switches, each of which can be placed in an open state or a closed state, can assume any of 16,777,216 ($2^{24}$) configurations or states. Assuming that selecting a potential switch state, setting the selected switch state, and evaluating the performance of the SSA using the set switch state each takes 1 ms, the total time to investigate all 16,777,216 configurations to select an optimal configuration is 50,331.6 seconds, or approximately 13.98 hours. During this time, the SSA system loses acceptable signal reception.

The search time associated with selecting a switch configuration may be improved by limiting the number of configurations that may be selected. For example, if the control system only evaluates 0.001% of the possible switch configurations, the search time can be reduced to slightly less than a second. Laboratory experiments have demonstrated that search times can be made significantly shorter. Nevertheless, the loss of acceptable signal reception every time an SSA system is tuned to a new station, channel, or band is still a significant problem.

Still, known SSA technology is limited to a basic configuration that uses a single point feed system connected to a single port antenna template having a large number of switches. This restriction has a negative impact on its potential performance and flexibility for many applications.

DETAILED DESCRIPTION

Figure 1:
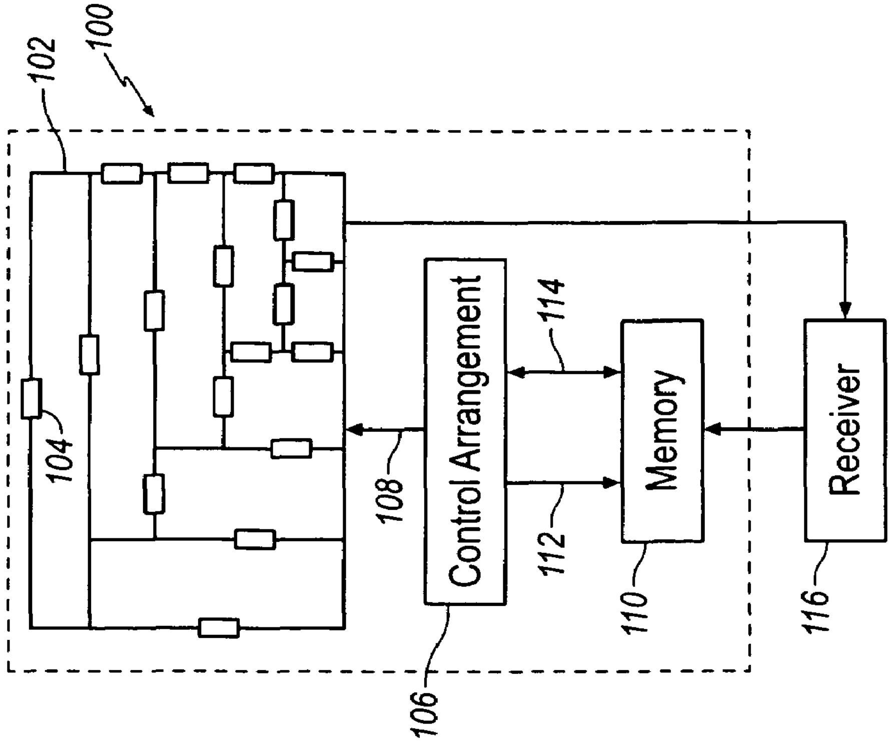
FIG. 1 is a block diagram illustrating an antenna system according to an embodiment.

Referring to FIG. 1, a self-structuring antenna (SSA) system is shown generally at 100 according to an embodiment. Antenna elements 102 are arranged with switching elements 104 in any desirable pattern, such as the illustrated pattern depicted in FIG. 1. It will be appreciated that the antenna elements 102 and the switching elements 104 can be arranged in patterns other than the exemplary pattern depicted in FIG. 1. Such patterns can be designed for acceptable performance under certain operating conditions.

As illustrated, the antenna elements 102 are depicted as solid line segments, and can be implemented in practice, for example, by wires or other conductors, including but not limited to conductive traces. Alternatively, patches or other radiating devices may also be used to implement one or more of the antenna elements 102.

The switching elements 104, which are shown generally as rectangles in FIG. 1, are controllably placed in an open state or a closed state via application of an appropriate control voltage or control signal. The switching elements 104 may be implemented in practice by using bipolar junction transistors (BJTs) controlled by applying an appropriate base voltage. Alternatively, the switching elements 104 may be implemented using field-effect transistors (FETs) controlled by applying an appropriate gate voltage. In yet another embodiment, the switching elements 104 may also be implemented using a combination of BJTs, FETs, integrated circuits (ICs), and the like. Even further, in another embodiment, the switching elements 104 can be implemented using mechanical devices, such as relays or miniature electromechanical system (MEMS) switches. For purposes of clarity, control terminals and control lines connected to individual switching elements 104 are not illustrated.

Closing a switching element 104 establishes an electrical connection between any antenna elements 102 to which the switching element 104 is connected. Opening a switching element 104 disconnects the antenna elements 102 to which the switching element 104 is connected. Accordingly, by closing some switching elements 104 and opening other switching elements 104, various antenna elements 102 can be selectively connected to form different configurations. Selecting which switching elements 104 are closed enables the antenna system 100 to implement a wide variety of different antenna shapes, including but not limited to loops, dipoles, stubs, or the like. The antenna elements 102 need not be electrically connected to other antenna elements 102 to affect the performance of the antenna system 100, rather, each antenna element 102 forms part of the antenna system 100 regardless of whether the antenna element 102 is electrically connected to adjacent antenna elements 102.

A control arrangement, which is shown generally at 106, selects particular switching elements 104 to be opened or closed to form a selected antenna configuration. The control arrangement 106 is operatively coupled to the switching elements 104 via control lines (e.g., a control bus 108). The control arrangement 106 may incorporate, for example, a switch controller module and a processor, which is seen generally at 130 and 142, respectively in FIG. 2.

To select particular switching elements 104 to be opened or closed, the control arrangement 106 selects an antenna configuration. When the antenna system 100 is first activated, the control arrangement 106 searches the conceptual space of possible antenna configurations to identify an antenna configuration that will produce acceptable antenna performance under the prevailing operating conditions. To increase the speed of the search process, a memory 110 stores antenna configurations (e.g., switch states, that are expected to produce acceptable antenna performance).

The memory 110 is operatively coupled to the control arrangement 106, for example, via an address bus 112 and a data bus 114. The memory 110 may be implemented using any of a variety of conventional memory devices, including, but not limited to, random access memory (RAM) devices, static random access memory (SRAM) devices, dynamic random access memory (DRAM) devices, non-volatile random access memory (NVRAM) devices, and non-volatile programmable memories, such as, for example, programmable read only memory (PROM) devices and electronically-erasable programmable read only memory (EEPROM) devices. The memory 110 may also be implemented using a magnetic disk device or other data storage medium.

The memory 110 can store the antenna configurations or switch states using any of a variety of representations. In some embodiments, each switching element 104 may be represented by a bit having a value of "1" if the switching element 104 is open or a value of "0" if the switching element 104 is closed in a particular antenna configuration. Accordingly, each antenna configuration is stored as a binary word having a number of bits equal to the number of switching elements 104 in the antenna system 100. The example antenna system 100 illustrated in FIG. 1 includes seventeen switching elements 104; therefore, according to the illustrated embodiment, each antenna configuration would be represented as a 17-bit binary word.

In some embodiments, multiple switching elements 104 may be controlled to assume the same open or closed state as a group. For example, as the antenna system 100 develops usage history, the control arrangement 106 may determine that performance benefits may result when certain groups of antenna elements 102 are electrically connected or disconnected. Alternatively, the determination to control such switching elements 104 as a group may be made at the time of manufacture of the antenna system 100. For example, certain zones formed by groups of antenna elements 102 may be controlled as a group for different frequency bands. When multiple switching elements 104 are controlled as a group, smaller binary words can represent antenna configurations or switch states. This more compact representation may yield certain benefits, particularly when the determination to control switching elements 104 as a group is made at the time of manufacture. In this case, the memory 110 may be implemented using a device having less storage capacity, potentially resulting in decreased manufacturing costs.

As the antenna system 100 is used, the control arrangement 106 updates the memory 110 to improve subsequent iterations of the search process. The control arrangement 106 causes the memory 110 to store binary words that represent the switch states for antenna configurations that are determined to produce acceptable antenna characteristics. Accordingly, when the control arrangement 106 repeats the search process (e.g., when the antenna system 100 is reactivated after having been deactivated), the search process can begin at an antenna configuration that is known to produce acceptable results. In conventional antenna systems lacking a memory 110, historical information is lost after each iteration of the search process (i.e., every time the communication system is turned off or tuned to a different communication band). Accordingly, in such conventional antenna systems, the search process begins anew with each iteration. By contrast, storing and using historical information relating to previous iterations of the search process can improve the speed of the search process.

The control arrangement 106 may read or update the memory 110 based on a control signal provided by a receiver 116, for example, when the communication system is activated. This control signal may be, for example, a received signal strength indicator (RSSI) signal generated as a function of an RF signal received by the receiver 116. Alternatively, the control signal may be generated as a function of an operational mode of the antenna system 100 (e.g., whether the antenna system 100 is to be configured to receive an AM or FM signal, a UHF or VHF television signal, a remote function access (RFA) signal, a global positioning system (GPS) signal, an SDARS signal, or a wireless data and voice communications signal, such as a CDMA or GSM signal. The control signal may also be generated as a function of the particular frequency or frequency band to which the receiver 116 is tuned.

When the control arrangement 106 receives the control signal from the receiver 116, the control arrangement 106 initiates the search process to select an antenna configuration in response to the control signal. The control arrangement 106 then addresses the memory 110 via the address bus 112 to access the binary word stored in the memory 110 that corresponds to the selected antenna configuration. The control arrangement 106 receives the binary word via the data bus 114, and, based on the binary word, outputs appropriate switch control signals to the switching elements 104 via the control bus 108. The switch control signals selectively open or close the switching elements 104 as appropriate.

Figure 2:
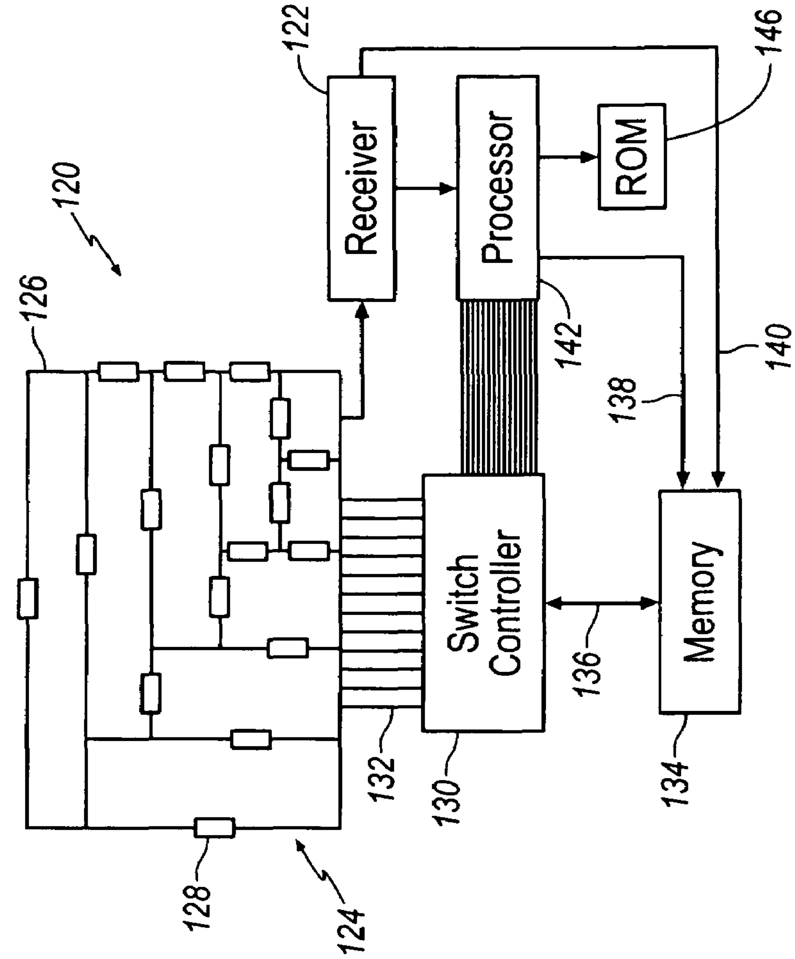
FIG. 2 is a block diagram illustrating a communication system according to an embodiment.

FIG. 2 shows a communication system generally at 120 according to another embodiment. According to one possible implementation, the communication system 120 may be installed in a vehicle, such as, for example, an automobile, boat, train, or the like. Alternatively, the communication system 120 may be implemented as a standalone unit, e.g., a portable entertainment system, such as a walkman, boombox, or the like. A receiver 122 receives a radiated electromagnetic signal, such as an RF signal, via an antenna 124. Depending on the particular application, the radiated electromagnetic signal can be of any of a variety of types, including but not limited to an AM or FM radio signal, a UHF or VHF television signal, an RFA signal, a GPS signal, an SDARS signal, or a wireless data and voice communications signal, such as, for example, a CDMA or GSM signal.

The antenna 124 includes antenna elements and switching elements, which are shown generally at 126 and 128, respectively. As illustrated, the antenna and switching elements 126, 128 operate and are arranged in a similar manner as that shown and described above in FIG. 1. A switch controller 130 provides control signals to the switching elements 128 to selectively open or close the switching elements 128 to implement particular antenna configurations. The switch controller 130 is operatively coupled to the switching elements 128 via control lines 132.

The switch controller 130 is also operatively coupled to a memory 134, for example, via a bus 136. The memory 134 stores antenna configurations or switch states and is addressable using one or more lines 138, 140 extending from the processor 142 and receiver 122, respectively. It should be noted that the memory 134 need not store all possible antenna configurations or switch states. For many applications, it would be sufficient for the memory 134 to store up to a few hundred of the possible antenna configurations or switch states. Accordingly, any of a variety of conventional memory devices may implement the memory 134, including, but not limited to, RAM devices, SRAM devices, DRAM devices, NVRAM devices, and non-volatile programmable memories, such as PROM devices and EEPROM devices. The memory 134 may also be implemented using a magnetic disk device or other data storage medium.

As similarly described above, the memory 134 can store the antenna configurations or switch states using any of a variety of representations. In some embodiments, each switching element 128 may be represented by a bit having a value of "1" if the switching element 128 is open or a value of "0" if the switching element 128 is closed in a particular antenna configuration. Accordingly, each antenna configuration is stored as a binary word having a number of bits equal to the number of switching elements 128 in the antenna 124.

In operation, the processor 142 selects an antenna configuration appropriate to the operational state of the communication system 120 (i.e., the type of radiated electromagnetic signal received by the receiver 122 or the particular frequency or frequency band in which the communication system 120 is operating). For example, the receiver 122 may provide a control signal to the processor 142 or the memory 134 that indicates the operational mode of the antenna 124, e.g., whether the antenna 124 is to be configured to receive an AM, FM, UHF, VHF, RFA, CDMA, GSM, GPS, or SDARS signal. The receiver 122 may also generate the control signal as a function of the particular frequency or frequency band to which the receiver 122 is tuned. The control signal may also indicate certain strength or directional characteristics of the radiated electromagnetic signal. For example, the receiver 122 may provide a received signal strength indicator (RSSI) signal to the processor 142.

The processor 142 responds to the control signal by initiating a search process of the conceptual space of possible antenna configurations to select an appropriate antenna configuration. Rather than beginning at a randomly selected antenna configuration each time the search process is initiated, the processor 142 starts the search process at a switch configuration that is known to have produced acceptable antenna characteristics under the prevailing operating conditions at some point during the usage history of the communication system 120. For example, the processor 142 may address the memory 134 to retrieve a default switch configuration for a given operating frequency. If the default configuration produces acceptable antenna characteristics, the processor 142 uses the default switch configuration. On the other hand, if the default switch configuration no longer produces acceptable antenna characteristics, the processor 142 searches for a new switch configuration using the default switch configuration as a starting point. Once the processor 142 finds the new switch configuration, the processor 142 updates the memory 134 via the lines 138 to replace the default switch configuration with the new switch configuration.

Regardless of whether the processor 142 selects the default switch configuration or another switch configuration, the processor 142 indicates the selected switch configuration to the switch controller 130 via lines 144. The switch controller 130 then addresses the memory 134 via the bus 136 to access the binary word stored in the memory 134 that corresponds to the selected antenna configuration. The switch controller 130 receives the binary word via the bus 136, and, based on the binary word, outputs appropriate switch control signals to the switching elements 128 via the control lines 132. The switch control signals selectively opens or closes the switching elements 128 as appropriate, thereby forming the selected antenna configuration.

The processor 142 is typically configured to operate with one or more types of processor readable media, such as a read-only memory (ROM) device, which is shown generally at 146. Processor readable media can be any available media that can be accessed by the processor 142 and includes both volatile media, nonvolatile media, removable media, and non-removable media. By way of example, and not limitation, processor readable media may include storage media and communication media. Storage media includes both volatile, nonvolatile, removable, and non-removable media implemented in any method or technology for storage of information, such as, for example, processor-readable instructions, data structures, program modules, or other data. Storage media includes, but is not limited to, RAM, ROM, EEPROM, flash memory, CD-ROM, digital video discs (DVDs), magnetic cassettes, magnetic tape, magnetic disk storage, or any other medium that can be used to store any desired information that can be accessed by the processor 142. Communication media typically embodies processor-readable instructions, data structures, program modules or other data in a modulated data signal such as a carrier wave or other transport mechanism including any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also intended to be included within the scope of processor-readable media.

Figure 3:
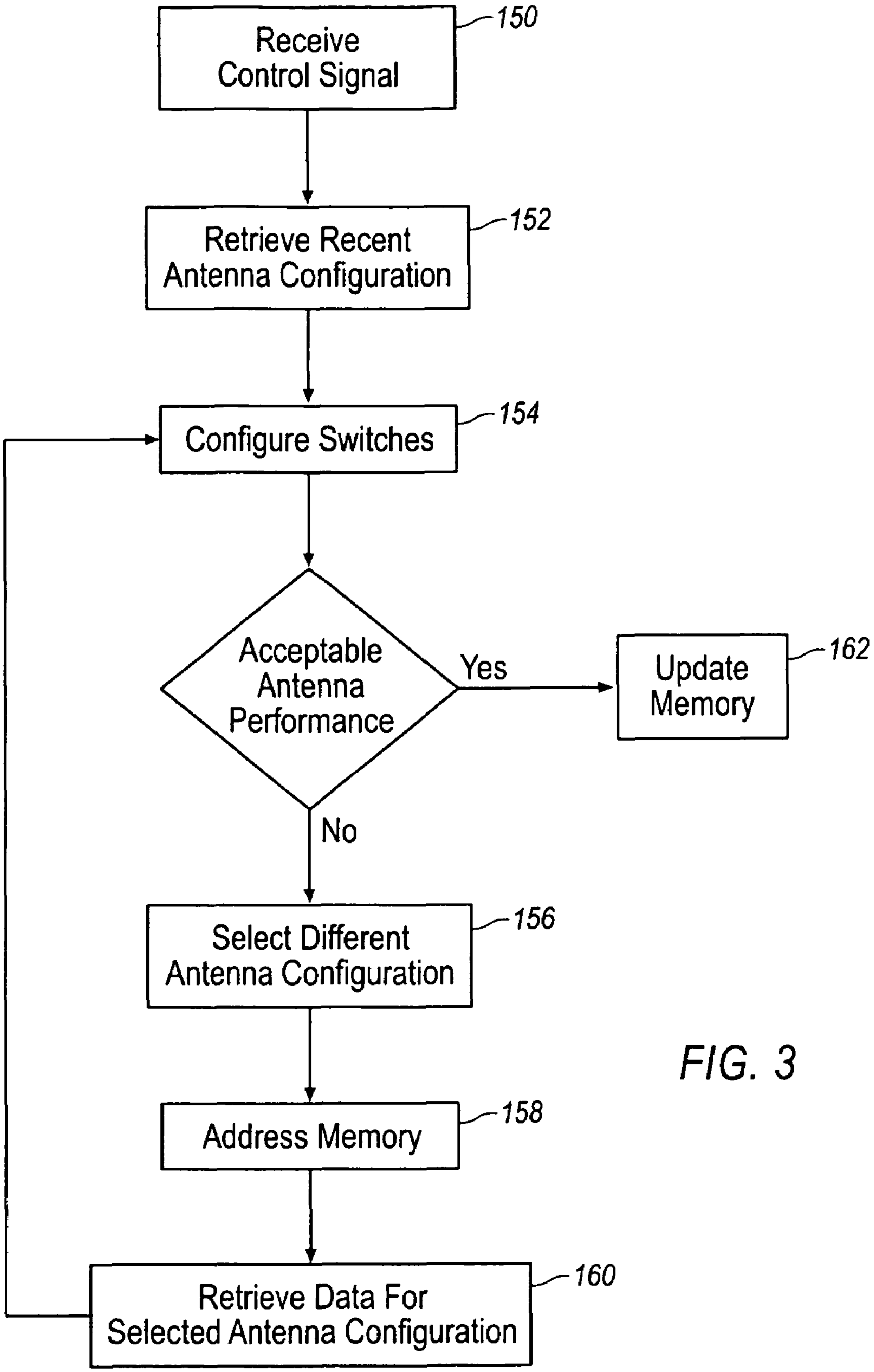
FIG. 3 is a flow diagram illustrating a method to configure an antenna system according to an embodiment.

FIG. 3 is a flow diagram illustrating an example method for configuring the antenna 124, according to another embodiment. The method may be performed, for example, in accordance with processor-readable instructions stored in the ROM 146. First, the processor 142 receives a control signal at step 150 from the receiver 122. As described above in connection with FIG. 2, the control signal may indicate the operational mode of the antenna 124 (e.g., the particular frequency or frequency band to which the receiver 122 is tuned). Alternatively, the control signal may indicate the impedance of the antenna 124. The control signal may also be an RSSI signal or other signal indicating certain strength or directional characteristics of the radiated electromagnetic signal. In addition, the control signal may be generated by a remote receiver other than the receiver 122, for example, to enable improved reception at the remote receiver.

In response to the control signal, the processor 142 selects an appropriate antenna configuration. Specifically, the processor 142 accesses the memory 134 to retrieve a recent antenna configuration at step 152, such as a default antenna configuration, that has produced or is expected to produce acceptable antenna characteristics in the current operational mode (e.g., for the current operating frequency or frequency band). The processor 142 then configures the switching elements 128 to produce the antenna configuration at step 154 by controlling the memory 134 to output data representing the antenna configuration. Based on this data, the switch controller 130 drives each switching element 128 to an open state or a closed state, as appropriate. The processor 142 evaluates the performance of the selected antenna configuration, for example, using an RSSI or other feedback signal provided by the receiver 122. If the selected antenna configuration produces acceptable antenna characteristics, the processor 142 uses that antenna configuration. On the other hand, if the selected antenna configuration does not produce acceptable antenna characteristics, the processor 142 selects a different antenna configuration at step 156. The processor 142 addresses, at step 158, the memory 134 and retrieves data representing the newly selected antenna configuration at step 160. Next, the processor 142 configures the switching elements 128 to produce the newly selected antenna configuration at step 154 and again evaluates the performance of the antenna configuration.

When the processor 142 identifies an antenna configuration that produces acceptable antenna characteristics, the processor 142 uses that antenna configuration. In addition, the processor 142 updates the memory 134 to replace the previously stored antenna configuration with the new antenna configuration at step 162. In this way, the communication system 120 adapts to changing environmental conditions, as well as changing conditions relating to the antenna 124 itself. For example, as the communication system 120 ages, certain antenna elements 126 or switching elements 128 may exhibit declining performance or stop functioning entirely. Accordingly, certain switch configurations that once produced acceptable antenna characteristics may no longer work as well. By updating the memory 134, such switch configurations can be eliminated from further consideration.

Figure 4:
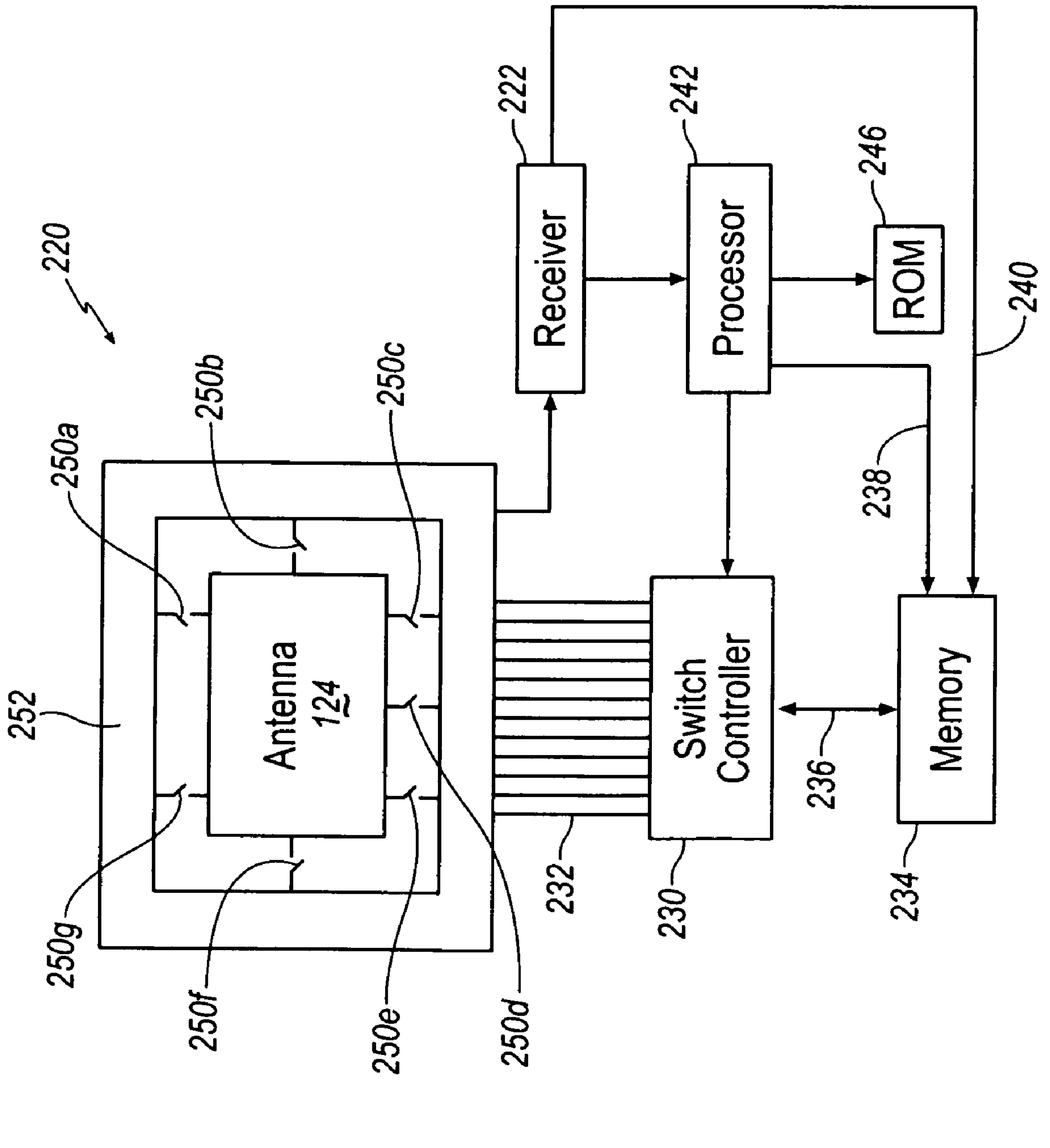
FIG. 4 is a block diagram illustrating a communication system according to an embodiment.

Referring to FIG. 4, a communication system is shown generally at 220 according to an embodiment including the self-structuring antenna 124. Self-structuring feed (SSF) ports or switches 250*a*-250*g* selectively interconnect the antenna 124 and a signal feed circuit in the form of a multiple feed template 252, a receiver 222 receives signals from the signal feed circuit 252, an SSF processor 242 receives an output signal from the receiver 222, an SSF switch controller 230 receives an output signal from the SSF processor 242, and control lines 232 interconnect the SSF controller 230 and switches 250*a*-250*g*.

The self-structure feed switches 250*a*-250*g* may selectively interconnect the antenna 124 and signal feed circuit 252 at respective spaced apart locations along a perimeter of the antenna 124. However, switches 250*a*-250*g* may be disposed at any location between the antenna 124 and the signal feed circuit 252. Moreover, although seven switches 250*a*-250*g* are shown, it will be appreciated that any desirable number of switches 250*a*-250*g* may be included.

In operation, each of the SSF feed switches 250*a*-250*g* may be independently actuated by the controller 230 between a first position in which the antenna 124 and signal feed circuit 252 are in communication though (a) switch(s) 250*a*-250*g* and a second position in which the antenna 124 and signal feed circuit 252 are not in communication through the switch(s) 250*a*-250*g*. Switches 250*a*-250*g* may function as a performance-adjusting device for improving the signal reception and/or signal transmission performance of the antenna 124. In one embodiment, the SSF switch controller 230 and SSF processor 242 control switches 250*a*-250*g* are dependent upon the signal received by the receiver 222 via the antenna 124.

The switches 250*a*-250*g* may begin in various combinations of the first and second positions when the antenna 124 passes a received signal to the receiver 222 via the switches 250*a*-250*g* and switch feed circuit 252. The SSF processor 242 may analyze an output signal from the receiver 222 to determine signal strength, signal-to-noise ratio, and/or some other attribute of the signal passed to the receiver 222. The SSF memory 234 may receive an analysis signal from the SSF processor 242 to record the performance of the antenna 124, as represented by the analysis and the position of the switches 250*a*-250*g* that produced that particular performance. The SSF switch controller 230 may then actuate at least one of the switches 250*a*-250*g* between the first and second positions to thereby provide an antenna arrangement with a different level of performance. The SSF memory 234 may again record the switch positions and the corresponding antenna performance produced thereby. The process may continue with the SSF switch controller 230 changing and recording switch positions and the resulting performance until the SSF processor 242 has determined a combination of switch positions that produces an optimal, favorable, or at least acceptable antenna performance.

The SSF processor 242 may try every possible combination of switch positions during the above process. Alternatively, the SSF processor 242 may only sample a number of combinations of switch positions and pick the best combination of the number sampled. As another alternative, the SSF switch controller 230 and processor 242 may include intelligence, which is shown generally at 234 and 246, respectively, that enables the SSF switch controller 230 and processor 242 to systematically select particular switch combinations that are likely to yield good performance. The switch combinations may be selected, for example, based upon recognized patterns in the performance of previously selected combinations of switch positions.

Accordingly, the SSF switch controller 230 memory 234 may include an operational database for storing the best combination of switch positions for each of a list of possible operating conditions. Experimentation or trials to determine the best switch combinations may occur in the factory, in the field, and/or may be ongoing over the operational life of the antenna system.

Figure 5:
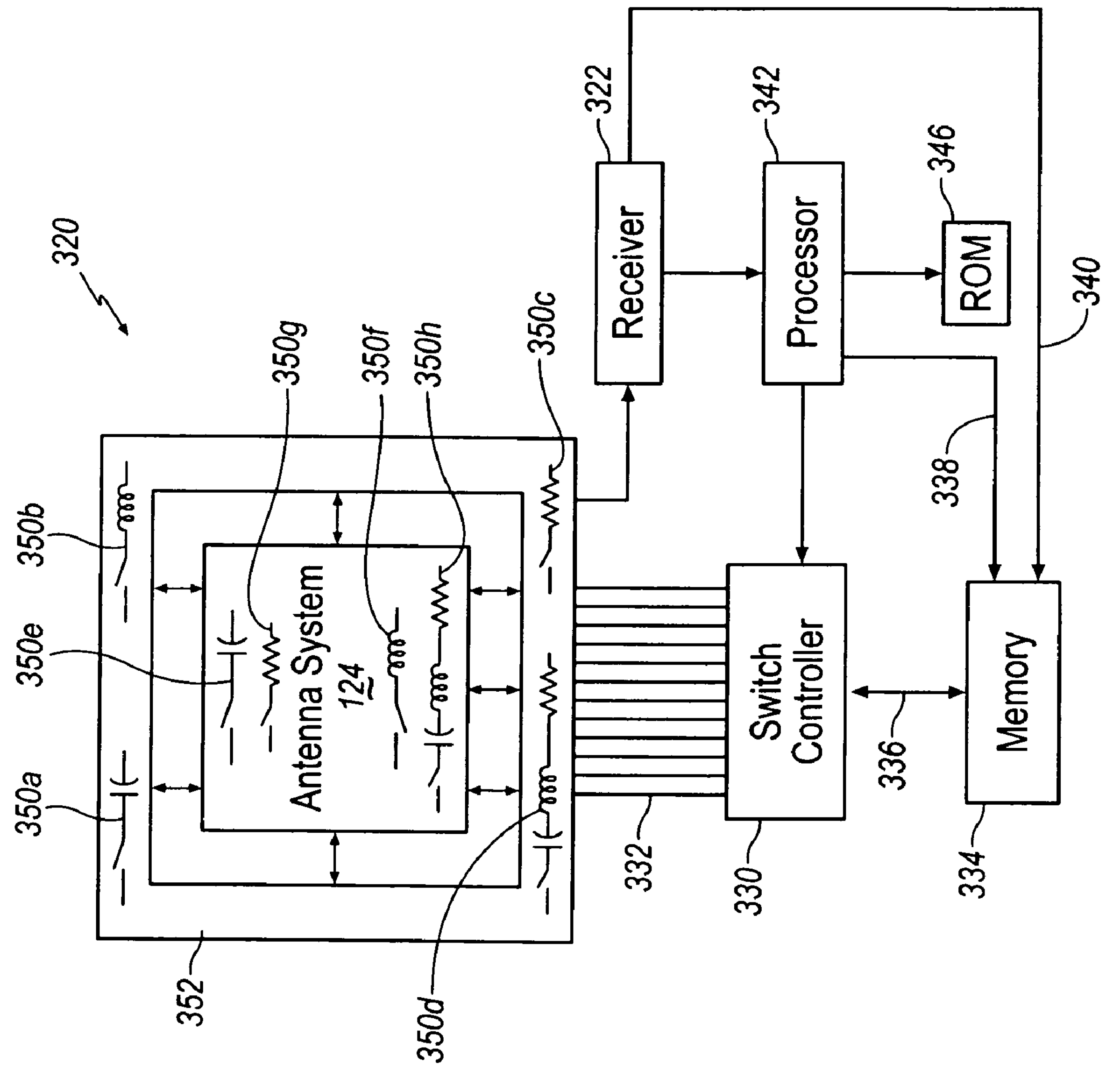
FIG. 5 is a block diagram illustrating a communication system according to an embodiment.

Referring to FIG. 5, a communication system is shown generally at 320 according to an embodiment including the self-structuring antenna 124. The communication system 320 includes switchable, self-structuring variable impedance elements (SSVIE) 350*a*-350*h* for selectively adding a variable impedance load to the antenna 124 and/or to a signal feed circuit 352. The elements 350*a*-350*h* are connected to the antenna 124 and signal feed circuit 352 and be may be used for impedance matching. A switchable capacitive load is seen at 350*a*, 350*e*. A switchable inductive load is seen at 350*b*, 350*f*. Switchable resistive loads are seen at 350*c*, 350*g*. Switchable capacitive, inductive; and/or resistive loads are seen at 350*d*, 350*h*. Any or all of the elements 350*a*-350*d* may be selectively connected in parallel and/or series with the signal feed circuit 352. Similarly, any or all of elements350*e*-350*h* may be selectively connected in parallel and/or series with the antenna 124. Each of the elements 350*a*-350*h* has a respective switch device that may be actuated to thereby connect or disconnect the element 350*a*-350*h* to/from the antenna 124 and antenna feed circuit 352.

As illustrated, a receiver 322 receives signals from the signal feed circuit 352. An SSVIE processor 342 receives an output signal from the receiver 322. An SSVIE switch controller 330 receives an output signal from the SSVIE processor 342, and control lines 332 interconnect the SSVIE switch controller 330 and the switch devices of the elements 350*a*-350*h*. The elements 350*a*-350*h* may all have different impedance values, including different capacitances and different inductances. In one embodiment, the elements 350*a*-350*h* are sections of coaxial cable having different lengths and therefore, different impedances, i.e., different capacitances, inductances, and resistances. Generally, the SSVIE switch controller 330 control the elements 350*a*-350*h* dependent upon a signal received by the receiver 322 via the antenna 124. The SSVIE controller 330 and processor 342 may open and close the switch devices of the elements 350*a*-350*h* in different combinations and then determine which of the combinations results in the best antenna performance. As another alternative, the SSVIE switch controller 330 and processor 342 may include intelligence, which is shown generally at 334 and 346, respectively, that enables the SSVIE switch controller 330 and processor 342 to systematically select particular element combinations that are likely to yield good performance.

Figure 6:
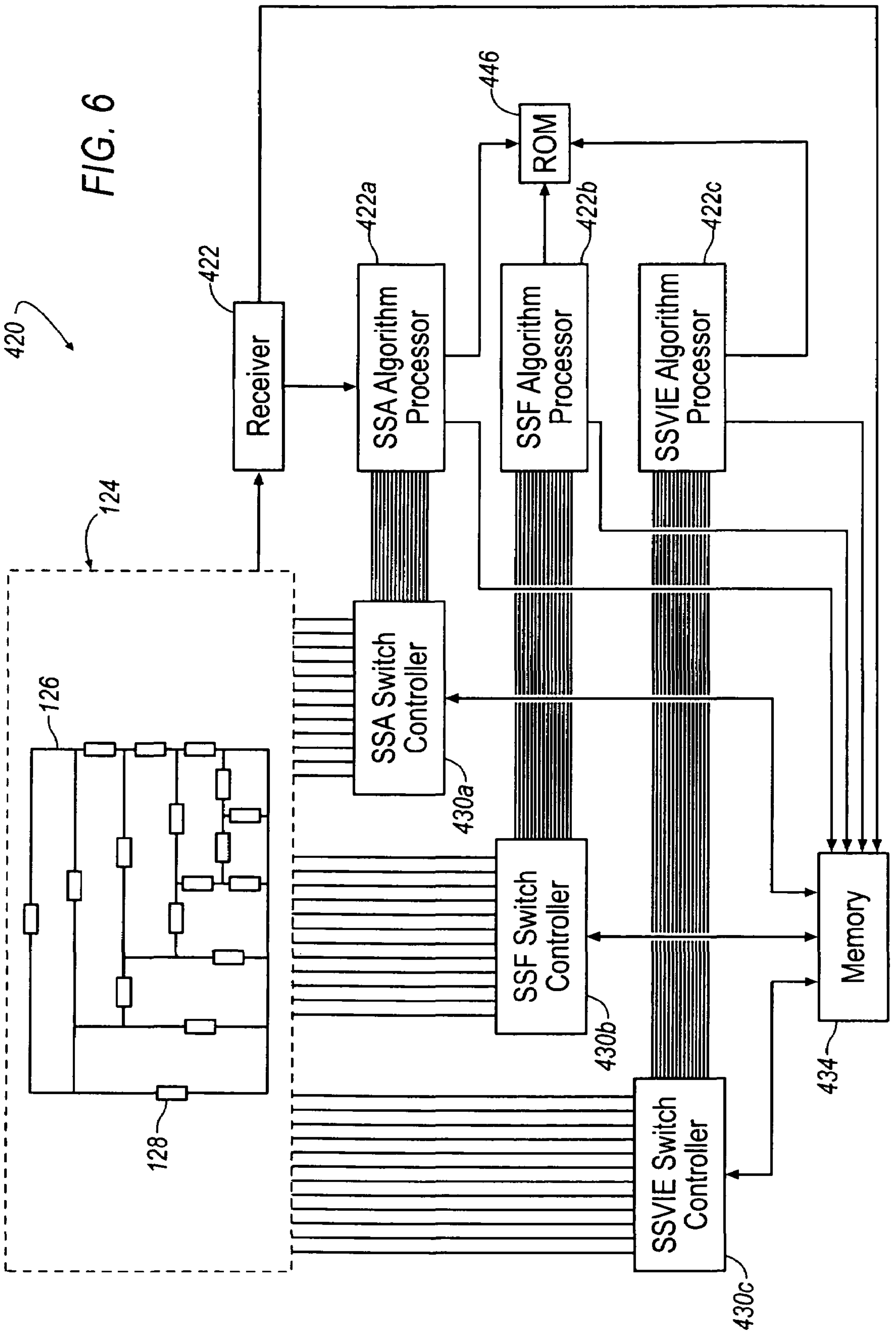
FIG. 6 is a block diagram illustrating a communication system according to an embodiment.

As demonstrated by the foregoing discussion, various embodiments may provide certain advantages. For instance, using the stored antenna configurations as a starting point for the process of searching for an antenna configuration that produces acceptable antenna characteristics under particular operating conditions may reduce the search time. In view of the improvements shown in FIGS. 1-5, performance of the SSA may be improved further by arraying self-structuring feed (SSF) and self-structuring variable impedance element (SSVIE) subsystems with the SSA. Referring now to FIG. 6, a communication system is shown generally at 420 according to an embodiment. The communication system 420 generally includes the same elements as the communication systems 120, 220, 320 shown in FIGS. 2, 4, and 5 with the exception that the communication system 420 includes one or more arrayed processors 422*a*422*c* and switch controllers 430*a*-430*c*. Although the processors 422*a*-422*c* and switch controllers 430*a*-430*c* are shown in an arrayed pattern that are each respectively separated into three blocks for purposes of clarity in illustrating the concept, it will be appreciated that the function of each block shown at 422*a*-422*c* and 430*a*-430*c* may be incorporated into a single processor and switch controller, respectively, as suggested in FIGS. 2, 4, and 5.

The communication system 420 generally utilizes the concept of using a combination of the SSA, SSF, and SSVIE techniques shown in FIGS. 2, 4, and 5. According to an embodiment, the communication system 420 may be implemented for use as an AM/FM rear window glass antenna system in a vehicle, which is shown generally at 500 in FIG. 7. The communication system 420 uses various self-structuring techniques as sub-systems that form an aggregates system that uses the best of each SSA, SSF, and SSVIE sub-system, or, a combination of the sub-systems to obtain an optimum antenna solution for its application, for example to a rear window glass antenna system 500 of a vehicle, and its operating environment.

Figure 7:
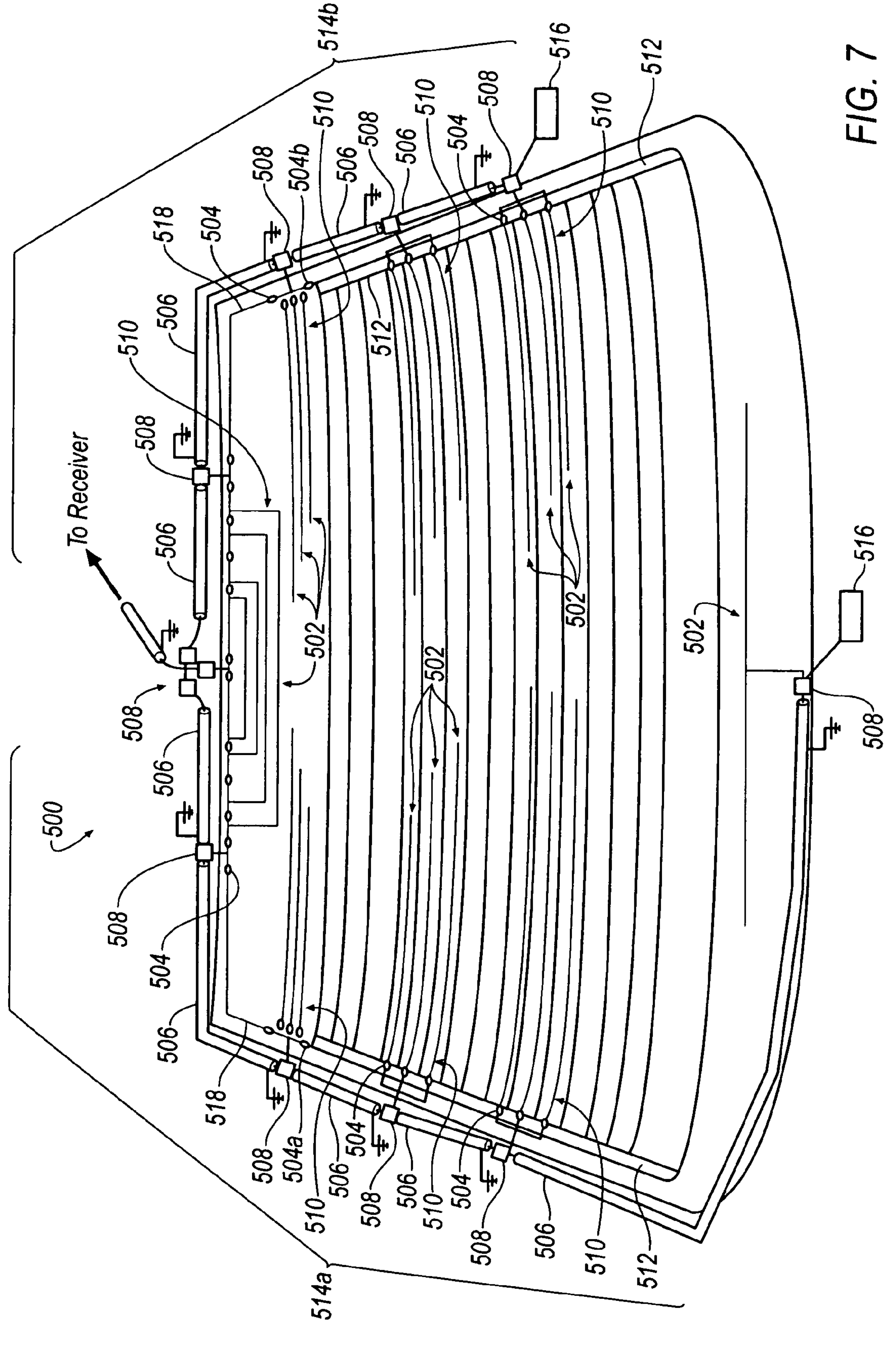
FIG. 7 is a representative view of an antenna system disposed on the back widow glass of a vehicle according to an embodiment.

Referring now to FIG. 7, the rear window glass antenna system 500 includes an SSA subsystem that includes a plurality of adjacent wire type antenna elements 502 that are RF connected or isolated by means of a plurality of single-pole single-throw RF switches, which are shown generally at 504. Each of the RF switches 504 are generally illustrated in the form of an oval for clarity. The rear window glass antenna system 500 also includes a perimeter of coaxial/slot transmission feed lines, which are shown generally at 506. Each feed line 506 generally defines a feed segment that are interconnected by a plurality of single-pole double-throw RF switches, which are shown generally at 508.

As illustrated, each single-pole double-throw switch 508 connects to an antenna branch 510 having a plurality of single-pole single-throw switches 504 and wire elements 502. According to the illustrated embodiment, the switches 504 are placed in line with the wire elements 502 at various pre-determined points. The open/close state of the various switches 504 are determined by the SSA algorithm processor 422*a* and an SSA switch controller 430*a*. Although thirty-four single-pole single-throw switches 504 and twelve single-pole double-throw switches 508 are shown, it will be appreciated that the rear window glass antenna system 500 is not limited to forty-six switches 504, 508 nor the size or shape of the wire elements 502.

The SSF subsystem of the rear window glass antenna system 500 generally includes the plurality of single-pole double-throw switches 508 and transmission feed lines 506. The resulting signals obtained from the single-pole double-throw switches 508 and transmission feed lines 506 can be used individually or in combinations and also can be determined by an SSF algorithm processor 422*b* and an SSF switch controller 430*b*. According to the illustrated embodiment, the SSF sub-system includes independent parallel coaxial lines and independent slot lines that are controlled by twelve single pole double-throw switches 508. These independent lines can be used singly, and in combinations. The slot transmission lines 518 are in parallel with the upper corner side feed coaxial cables. According to an embodiment, the rear window defogger grid, which is shown generally at 512, may be utilized as an additional sub-antenna template with the feed system if the single-pole single throw switches shown at 502a, 502b are in the closed position.

The SSVIE subsystem of the rear window glass antenna system 500 consists of switchable variable impedance elements placed at various pre-determined locations about the antenna template and within branches of the coaxial and slot SSF sub-system. According to an embodiment the SSVIE sub-system includes a plurality of side coaxial and slot transmission lines, which are shown generally at 514a, 514b, that can be used as variable impedance elements. If desired, the single-pole single-throw switches 504a, 504b may be thrown to the closed state to include the rear window defogger grid 512 as an additional template for antenna and impedance element purposes. Additionally, a resistive load 516 may be located at the terminal ends of the transmission feed lines 506 to match the load across the transmission feed lines 506. According to an embodiment, the resistive load 516 may be a fifty, seventy-five, one-hundred, or a one-hundred-and-twenty ohm load.

While the invention has been specifically described in connection with certain specific embodiments thereof, it is to be understood that this is by way of illustration and not of limitation, and the scope of the appended claims should be construed as broadly as the prior art will permit.

What is claimed is:

1. An antenna system comprising:

a plurality of antenna elements, switching elements, and transmission feed lines disposed on a rear window glass, wherein the plurality of switching elements are arranged with the antenna elements and transmission feed lines to, when selectively closed, electrically couple selected ones of the antenna elements and transmission feed lines to one another to generate an antenna configuration selected from a plurality of antenna configurations;

a non-volatile memory configured to store data representing at least some of the plurality of antenna configurations;

a control arrangement operatively coupled to the plurality of switching elements and configured to close selected ones of the switching elements as a function of the data stored in said memory; and means operative to selectively update said data on a function of previously selected antenna configurations.

2. The antenna system of claim 1, wherein the control arrangement is coupled to receive a control signal and configured to:

select the antenna configuration from the plurality of antenna configurations in response to the control signal;

select the selected ones of the switching elements as a function of the selected antenna configuration; and provide a switch control signal to the selected ones of the switching elements to close the selected ones of the switching elements.

3. The antenna system of claim 2, wherein the control signal comprises one of a received signal strength indicator (RSSI) signal, an antenna impedance indicator signal, and a control signal received from a remote receiver.

4. The antenna system of claim 2, wherein the control signal is generated as a function of an operational mode of the antenna system.

5. The antenna system of claim 4, wherein the operational mode is selected from the group consisting of AM radio, FM radio, television, remote function access (RFA), wireless data and voice communications, global positioning system (GPS), and satellite-based digital audio radio services (SDARS).

6. The antenna system of claim 2, wherein the control signal is generated as a function of a tuned frequency.

7. The antenna system of claim 2, wherein the control signal is generated in response to activating a vehicle communication system.

8. The antenna system of claim 2, wherein the control arrangement comprises:

a processor arrangement configured to select the antenna configuration from the plurality of antenna configurations in response to the control signal; and a switch controller operatively coupled to the plurality of switching elements and to the processor arrangement and configured to close the selected ones of the switching elements as a function of the selected antenna configuration.

9. A communication system comprising:

a receiver configured to generate a control signal in response to a radiated electromagnetic signal;

a plurality of antenna elements operatively coupled to a plurality of double-throw switching elements and arranged to receive the radiated electromagnetic signal;

a plurality of single-pole switching elements arranged with the antenna elements to, when selectively closed, electrically couple selected ones of the antenna elements to one another;

a plurality of transmission feed lines located on a rear window glass operatively coupled to the receiver and arranged to feed the radiated electromagnetic signal, wherein the plurality of single-pole double-throw switching elements are arranged with the transmission feed lines to, when selectively closed, electrically couple selected ones of the transmission feed lines to one another;

a non-volatile memory configured to store data representing a plurality of antenna configurations;

a processor arrangement operatively coupled to the memory and operatively coupled to receive the control signal and configured to select an antenna configuration from the plurality of antenna configurations as a function of previously selected antenna configurations in response to the control signal and to selectively update the data stored in the memory in response to the control signal; and a switch controller operatively coupled to the plurality of single-pole single-throw and single-pole double-throw switching elements and to the processor arrangement and configured to close selected ones of the single-pole single-throw and single-pole double-throw switching elements as a function of the selected antenna configuration.

10. The communication system of claim 9, wherein the control signal comprises one of a received signal strength indicator (RSSI) signal, an antenna impedance indicator signal, and a control signal received from a remote receiver.

11. The communication system of claim 9, wherein the receiver is configured to generate the control signal as a function of an operational mode of the antenna system.

12. The communication system of claim 11, wherein the operational mode is selected from the group consisting of AM radio, FM radio, television, remote function access (RFA), wireless data and voice communications, global positioning system (GPS), and satellite-based digital audio radio services (SDARS).

13. The communication system of claim 9, wherein the receiver is configured to generate the control signal as a function of a tuned frequency.

14. The communication system of claim 9, wherein the receiver is configured to generate the control signal in response to being activated.

15. An antenna system comprising:

a plurality of antenna elements, switching elements, and transmission feed lines disposed on a rear window glass, wherein the plurality of switching elements are arranged with the antenna elements and transmission feed lines to, when selectively closed, electrically couple selected ones of the antenna elements and transmission feed lines to one another to generate an antenna configuration selected from a plurality of antenna configurations;

a non-volatile memory configured to store data representing at least some of the plurality of antenna configurations;

a control arrangement operatively coupled to the plurality of switching elements and configured to close selected ones of the switching elements as a function of the data stored in said memory; and means operative to selectively update said data on a function of previously selected antenna configurations, wherein the switching elements include single-pole single-throw and single-pole double throw switches.

16. The antenna system of claim 15, wherein the single-pole single-throw switching elements arranged with the antenna elements to, when selectively closed, electrically couple selected ones of the antenna elements to one another, and, wherein the single-pole double-throw switching elements arranged with the antenna elements and transmission feed lines to, when selectively closed, electrically couple selected ones of the antenna elements and transmission feed lines to one another.

* * * * *